United States Patent
Singer

(10) Patent No.: US 7,490,435 B2
(45) Date of Patent: Feb. 17, 2009

(54) GARDEN BED ASSEMBLY AND METHOD AND KIT THEREFOR

(75) Inventor: Lisa R. Singer, Poway, CA (US)

(73) Assignee: Modular Merchants, Inc., San Diego, CA (US)

( * ) Notice: Subject to any disclaimer, the term of this patent is extended or adjusted under 35 U.S.C. 154(b) by 0 days.

(21) Appl. No.: 11/957,328

(22) Filed: Dec. 14, 2007

(65) Prior Publication Data

US 2008/0092442 A1    Apr. 24, 2008

Related U.S. Application Data

(63) Continuation-in-part of application No. 11/073,072, filed on Mar. 4, 2005, now Pat. No. 7,424,787.

(60) Provisional application No. 60/550,746, filed on Mar. 4, 2004.

(51) Int. Cl.
*A01G 9/20* (2006.01)

(52) U.S. Cl. .................. 47/19.1; 47/33; 47/66.1; 47/66.6

(58) Field of Classification Search .............. 47/65.5, 47/66.1, 66.3, 66.6, 17, 18, 19.1, 33; 52/102; 206/423; D11/143, 155
See application file for complete search history.

(56) References Cited

U.S. PATENT DOCUMENTS

| | | | |
|---|---|---|---|
| 2,242,149 A | 5/1941 | Shelley | |
| 2,860,805 A | 11/1958 | Katterjohn | |
| 3,912,407 A | 10/1975 | Heininger | |
| 4,068,423 A | 1/1978 | Marsh | |
| 4,099,344 A * | 7/1978 | Ruemeli | 47/19.1 |
| 4,242,833 A | 1/1981 | Maes, Jr. | |
| 4,363,189 A | 12/1982 | O'Donnell, III | |
| 4,567,690 A | 2/1986 | Murrell | |
| 4,869,018 A * | 9/1989 | Scales et al. | 47/33 |
| 4,897,955 A * | 2/1990 | Winsor | 47/33 |
| 4,901,473 A | 2/1990 | Taule | |
| 5,322,793 A * | 6/1994 | Yarnell | 435/290.1 |
| 5,806,249 A * | 9/1998 | Helms | 52/102 |
| 6,134,834 A * | 10/2000 | Ripley et al. | 47/86 |
| D536,584 S * | 2/2007 | Petty | D8/1 |
| 2007/0130824 A1* | 6/2007 | Teich | 47/21.1 |
| 2007/0151150 A1* | 7/2007 | Sandoval | 47/66.1 |
| 2007/0271843 A1* | 11/2007 | Kirkpatrick | 47/66.3 |

* cited by examiner

*Primary Examiner*—T. Nguyen
(74) *Attorney, Agent, or Firm*—Bernard L. Kleinke; Duckor Spradling Metzger & Wynne

(57) ABSTRACT

There is disclosed a garden bed assembly and a method of making it. The garden bed assembly includes at least one planter containing suitable planting soil or other growing media. The assembly includes a fence/planter structure and an upright solid imperforate inner planter structure for defining the planter. The fence/planter structure includes a series of fence sections and a gate for surrounding the planter. Each fence/planter section has a solid imperforate lower portion to help define the planter.

7 Claims, 9 Drawing Sheets

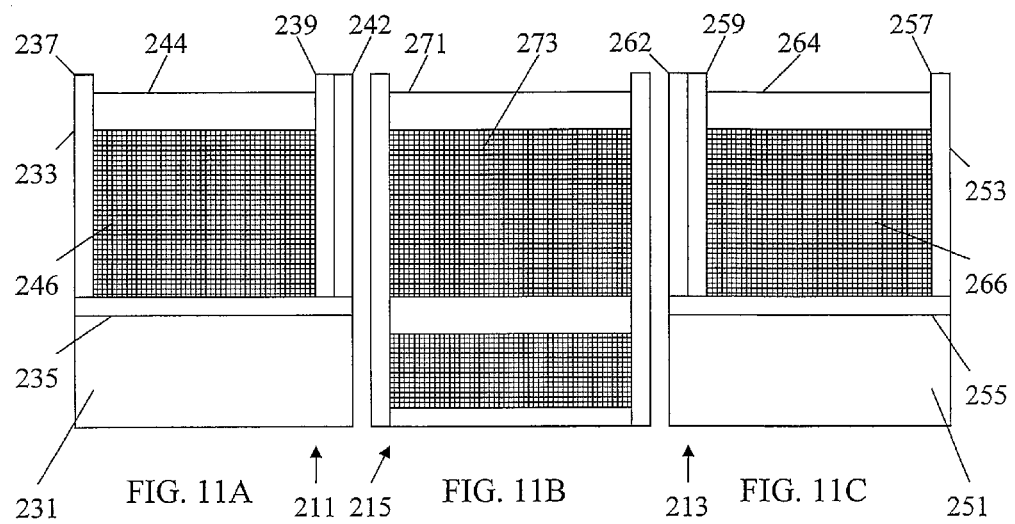
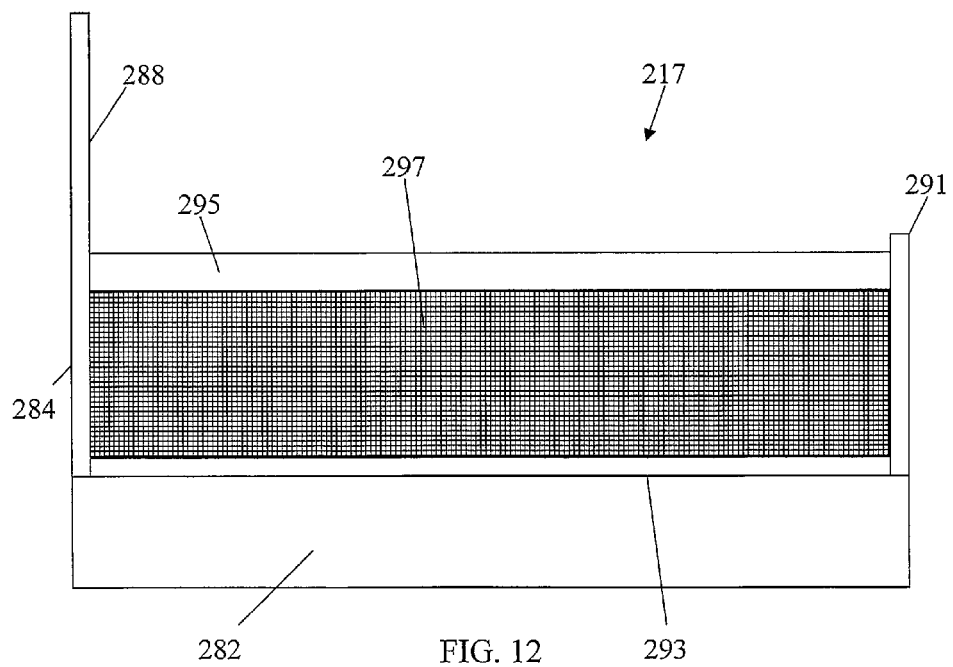

GARDEN BED ASSEMBLY AND METHOD AND KIT THEREFOR

RELATED APPLICATION

This application is a continuation-in-part application to U.S. patent application Ser. No. 11/073,072, entitled GARDEN BED ENCLOSURE ASSEMBLY AND METHOD AND KIT THEREFOR, filed Mar. 4, 2005, which claims priority to U.S. provisional patent application No. 60/550,746, entitled GARDEN BED ENCLOSURE ASSEMBLY AND METHOD AND KIT THEREFOR, filed Mar. 4, 2004. Each of these patent applications is incorporated herein by reference.

FIELD OF THE INVENTION

The present invention relates in general to a garden bed assembly and method of making it, as well as a kit therefor. It more particularly relates to a garden bed assembly, kit and method useful for growing plants such as fruits and vegetables, in a backyard or other setting.

BACKGROUND ART

There is no admission that the background art disclosed in this section legally constitutes prior art.

Amateur gardeners have attempted to establish and grow fruits and vegetables in a backyard setting, and have met with varying degrees of success. There have been a variety of reasons for less than desirable results.

For example, soil conditions vary widely, and amateur gardeners may not have the time or knowledge to properly prepare the soil for suitable growing conditions. Other deterrents to successful gardening of comestible products relate to creatures such as gophers, rabbits, and other animals, who will eat otherwise healthy plants.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein:

FIG. 11A is a front view of the left front section of the garden bed assembly of FIG. 10;

FIG. 11B is a front view of the gate of the garden bed assembly of FIG. 10;

FIG. 11C is a front view of the right front section of the garden bed assembly of FIG. 10;

FIG. 12 is a front view of the left side section of the garden bed assembly of FIG. 10;

DETAILED DESCRIPTION OF CERTAIN EMBODIMENTS OF THE INVENTION

Figure 1:
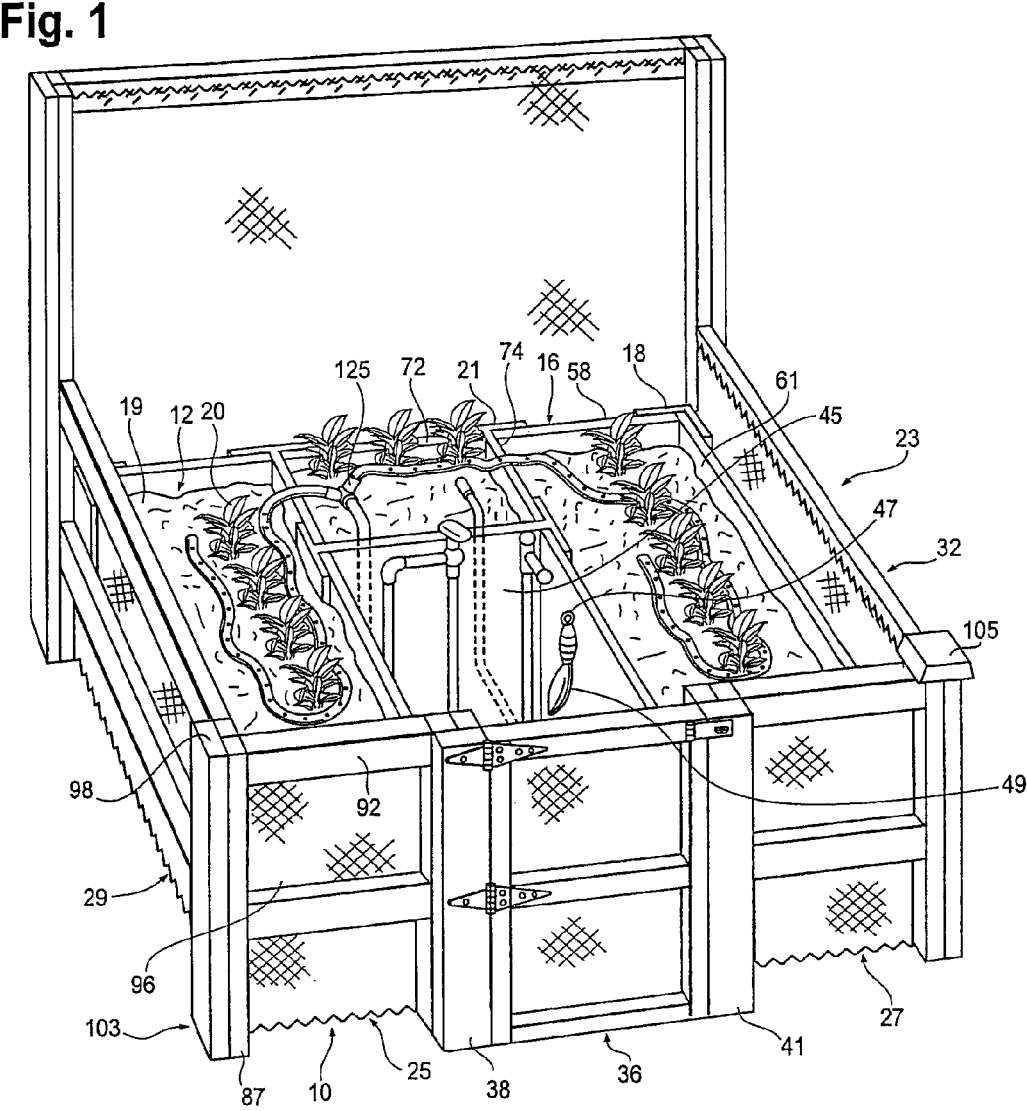
FIG. 1 is a fragmentary pictorial view of a garden bed assembly constructed according to an embodiment of the invention.

There is disclosed a garden bed assembly and a method of making it. The garden bed assembly includes at least one raised garden planter containing suitable planting soil or other growing media. The assembly as disclosed herein includes a fence/planter structure and an inner planter structure for defining the planter. The fence/planter structure includes a series of fence sections for at least partially surrounding the planter. Each fence section has a solid imperforate lower portion and an upper portion prohibiting unwanted creatures such as gophers, rabbits and other animals from gaining access to the growing plants in the garden planter.

In accordance with certain embodiments of the present invention, there is provided a garden bed assembly which includes at least one planter for holding planting media. The garden bed assembly may include an outer fence/planter structure surrounding an enclosed area including a plurality of fence/planter sections and a gateway permitting access to the enclosed area. Each of the fence/planter sections may include a solid imperforate lower portion to help define at least one planter. A gate may close over the gateway. An upright solid imperforate inner planter structure may be disposed within the enclosed area and be attached to the outer fence/planter structure at two or more locations to help define the at least one planter. A path may be disposed within the enclosed area and be accessed through the gateway, where the path is defined by the inner planter structure and the gateway. The at least one planter for holding planting media may be formed by the lower portions of the fence/planter sections and the inner planter structure. The fence/planter structure may include an arrangement of fence sections joined together at their ends.

According to a method of a disclosed embodiment of the invention, there is provided a method of constructing a garden bed structure including assembling an outer fence/planter structure having a generally rectangular shape and defining an enclosed area, assembling an upright solid imperforate inner planter structure, and attaching the inner planter structure within the enclosed area and attached to the outer fence/planter structure at two or more locations to help define at least one planter. The outer fence/planter structure may include a gate providing access to the enclosed area and a plurality of fence/planter sections each having solid imperforate lower portions to help define the at least one planter. A path may be disposed within the enclosed area and be accessed through the gate, where the path is defined by the inner planter structure and the gate. The lower portions of the fence/planter sections and the inner planter structure may form the at least one planter for holding planting media.

Referring now to FIGS. 1 through 5 of the drawings, there is shown a garden bed assembly 10, which is constructed in accordance with an embodiment of the present invention. The assembly 10 includes a set of three raised garden bed planter boxes 12, 14 and 16 arranged in a U-shaped configuration. It should be understood by those skilled in the art that other arrangements of the planter boxes, and the number of planter boxes, may vary. Each planter box of the assembly 10 may be generally rectangular in shape, and various different sizes and shapes of the planter boxes may vary as will become apparent to those skilled in the art.

A set of brackets such as a corner bracket 18 and a T bracket 21 are provided to secure the walls of the boxes in place as hereinafter described in greater detail. Each planter box such as the planter box 12 is open at its top and contains soil or growing media such as the soil 19, for growing plants such as a plant 20.

A fence generally indicated at 23 at least partially surrounds the planter boxes to help protect the plants from unwanted pests from eating the plants. The fence 23 includes a set of open frame fence sections such as a pair of front fence sections 25 and 27, and a pair of longer side fence sections 29 and 32. A tall rear fence section 34 completes the enclosure and serves as a trellis for certain growing plants. A gate 36 is connected between a pair of upright posts 38 and 41 between the front fence sections 25 and 27. A gate latch 43 releasably secures the gate 36 in place.

It is to be understood that a tall section may be included as one or more of the sections, or all of the sections can be the same height, if desired. The height of the sections, such as the sections 25, 27, 29, and 32 may all be substantially the same, and may vary in size, such as between about three feet and about seven feet.

An irrigation system generally indicated at 45 may be provided to supply water to the plants to facilitate their growth. One or more tool holders, such as a tool holder or hook 47 may be attached to one or more of the planter boxes of the fence 23 for conveniently holding garden tools such a garden tool 49 for use by the gardener.

Figure 5:
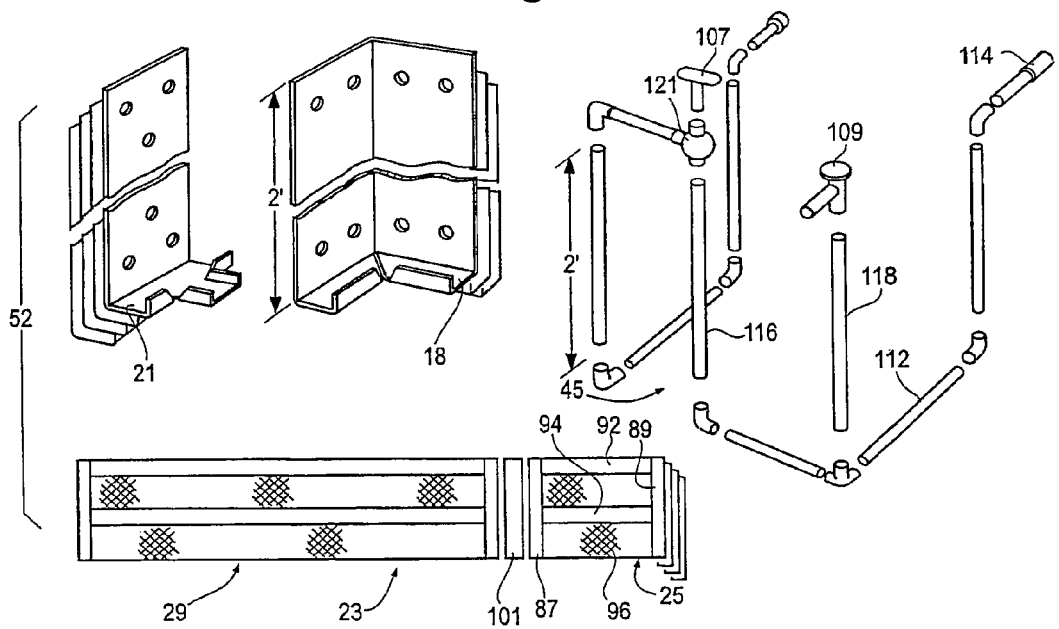
FIG. 5 is a pictorial view of a garden box assembly kit constructed according to a further embodiment of the invention.

Referring now to FIG. 5, there is shown a kit 52 which includes the various parts to assemble the garden bed assembly 10 of FIG. 1. The kit 52 may include a set of brackets for assembling the planter boxes, and the brackets may include the brackets 18 and 21. Optionally, the kit 52 may include the irrigation system 45. Optionally, the kit 52 may also include the fence 23 including the fence sections 25 and 29. It will become apparent to those skilled in the art that various combinations of the parts of the kit 52 may be included. Generally, however, it is desirable to not include the walls of the planter boxes in the kit, since those items can be purchased separately by the user and the kit 52 may be sent via a carrier to the purchaser.

Figure 4:
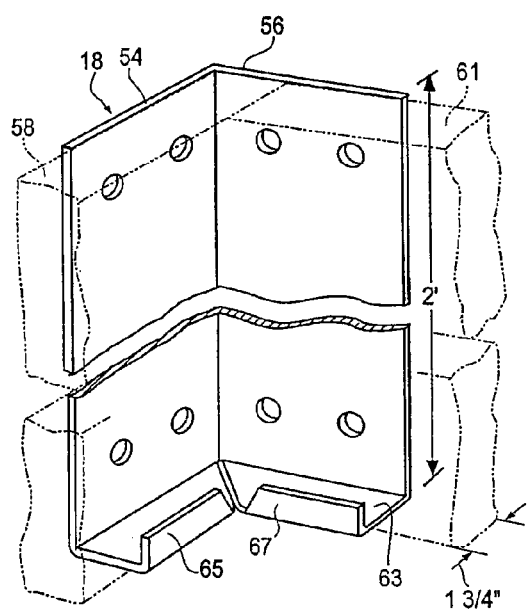
FIG. 4 is an enlarged pictorial view of a planter box corner bracket.

Referring now to FIG. 4, the corner brackets such as the corner bracket 18 will now be described in greater detail for joining the ends of two planter box walls together at a corner. The bracket 18 generally comprises a pair of upstanding flanges 54 and 56, which are integrally connected together at a right angle and are perforated for receiving fastening devices such as screws. In this regard, the bracket 18 receives the ends of a pair of planter box boards or walls 58 and 61 at right angles to one another, and the perforated upstanding flanges can then be conveniently fastened thereto by suitable fastening devices such as screws (not shown).

An L-shaped horizontal flange 63 is integrally connected at right angles to the bottom edges of the upstanding flanges 54 and 56. The L-shaped horizontal flange 63 includes a pair of upstanding integrally connected flanges or retainers 65 and 67. The retainer 65 is parallel to and spaced from the upstanding flange 56 to receive the wall 61 therebetween for securing it in place to facilitate the fastening of the bracket 18 to the wall 61. Similarly, the upstanding retainer 67 is spaced from the upstanding flange 54 to receive the wall 58 therebetween to facilitate the fastening of the upstanding flange 54 thereto. The height of the upstanding flanges 54 and 56 are substantially the same as the height of the planter box walls. Both the height of the planter boxes and the bracket upstanding flanges may vary, and may, for example, be about 12 inches high, or about 24 inches high.

Figure 2:
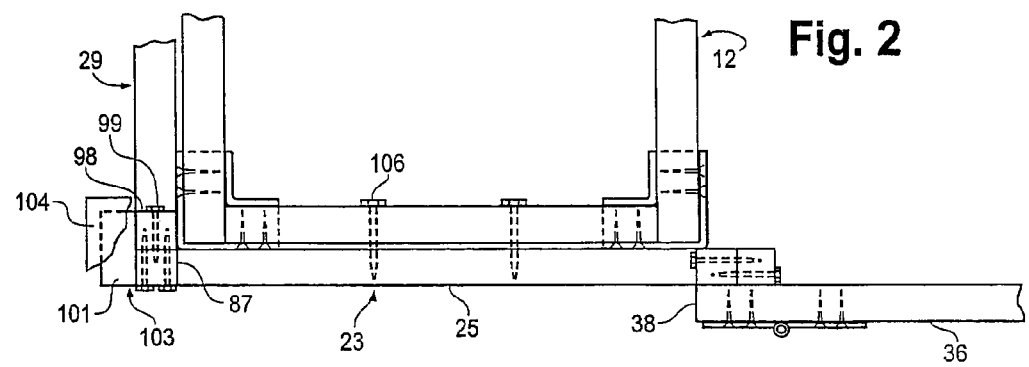
FIG. 2 is an enlarged fragmentary plan view of the assembly of FIG. 1.
Figure 3:
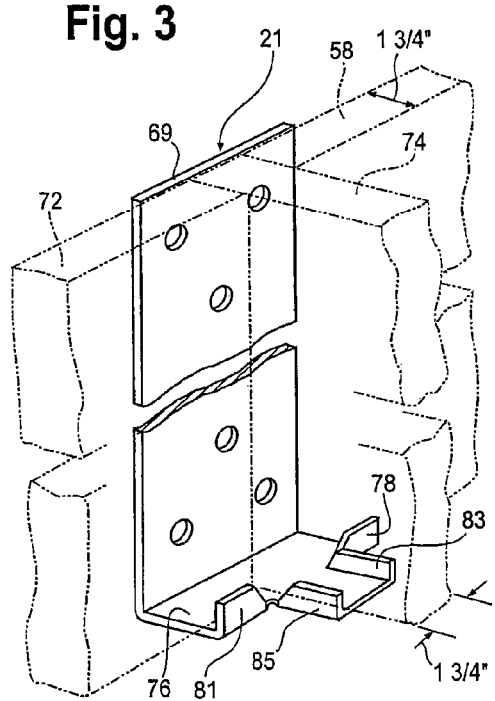
FIG. 3 is an enlarged pictorial view of a planter box T bracket of the assembly of FIG. 1.

Referring now to FIG. 2, the T brackets such as the T bracket 21 will now be described in greater detail for joining together the ends of three planter box walls in a T-shaped configuration. The bracket 21 includes a single upstanding flange 69 which is adapted to be secured to three separate planter box walls such as the walls 58, 72 and 74. In this regard, the upstanding flange 69 is perforated to receive fastening devices such as screws (not shown) to secure the walls in a T-shaped configuration.

A T-shaped horizontal flange 76 is integrally connected to the bottom edge of the upstanding flange 69. An upstanding flange or retainer 78 is spaced from and parallel to the upstanding flange 69 to receive an end portion of the wall 58 therebetween while it is being fastened in place. Similarly, an upstanding flange or retainer 81 is spaced from and parallel to the upstanding flange 69 to receive the wall 72 therebetween while it is being fastened in place to the upstanding flange 69.

A pair of upstanding flanges or retainers 83 and 85 on the horizontal flange 76 are adapted to receive the wall 74 there between while it is being fastened in place to the flange 69. In this regard, screws or other fastening devices (not shown) fasten the flange 69 to an edge of the wall 74.

The upstanding flange 69 may vary in height in a similar manner as the upstanding flanges 54 and 56 of the corner bracket 18.

Considering now the fence sections in greater detail, the fence section 25 will now be described as being representative of the open frame constructions of the other fence sections forming the fence 23. The fence section 25 includes a pair of end rails 87 and 89 and a pair of cross rails 92 and 94 to provide a rectangular configuration for the fence section 25. Poultry wire, hardware cloth, or other open mesh fabric 96 is fastened by suitable means (not shown) to the backside of the fence section 25 to prevent unwanted pests from entering the assembly 10.

The end rail 87 may be fastened to an end rail 98 of the fence section 29 by suitable fastening devices such as a screw 99. A face rail 101 may be fastened to the end rails 87 and 98 to form a post 103. The post may include a cap block 104 shown partially in FIG. 2. The cap block 104 is provided for decorative purposes and to conceal, to a certain extent, the fact that the post 103 is composed of a set of three rails. The cap block 104 is similar to the cap block 105 (FIG. 1). Although only one cap block is shown in FIG. 1, there may be cap blocks (not shown) on each one of the intersections of the adjoining fence sections as well. In this manner, the fence 23 can be conveniently assembled without the use of posts and it has a finished as well as an aesthetically pleasing appearance.

As shown in FIG. 2, the fence 23 is fastened to the planter boxes by suitable fastening devices such as a screw 106. In this manner, the fence 23 is at least partially supported by the planter boxes. However, it is to be understood that the fence 23 may be supported in a conventional manner by concrete footings (not shown).

Referring now to FIGS. 1 and 5, the irrigation system 45 will now be considered in greater detail. The system 45 may include a timer 107 and a garden hose spigot 109. The timer 107 controls the supply of water to the plants in the planter boxes of the assembly 10. The spigot 109 enables the user to connect a conventional garden hose (not shown) for additional manual watering of the plants.

The system 45 may include a supply pipe 112 which may include a hose end pipefitting for attachment to a conventional garden hose to supply water to the irrigation system 45. It is to be understood that a permanent water supply may be attached to the end of the supply pipe 112 in place of the hose end pipefitting 114 for a more permanent installation instead of using a garden hose for supplying the water.

A pair of upright pipes 116 and 118 may supply the water from the supply pipe 112 to a valve 121 controlled by the timer 107, and to the hose spigot 109. The timer 107 controls the valve 121 connected in fluid communication to the pipe 116. The valve 121 may be connected in fluid communication with a set of discharge pipes 123 to supply the water under the control of the timer 107 to a soaker hose outlet 125, which may be connected to a series of perforated soaker hoses 127 disposed within the planter boxes for supplying water to the plants growing therein.

Figure 6:
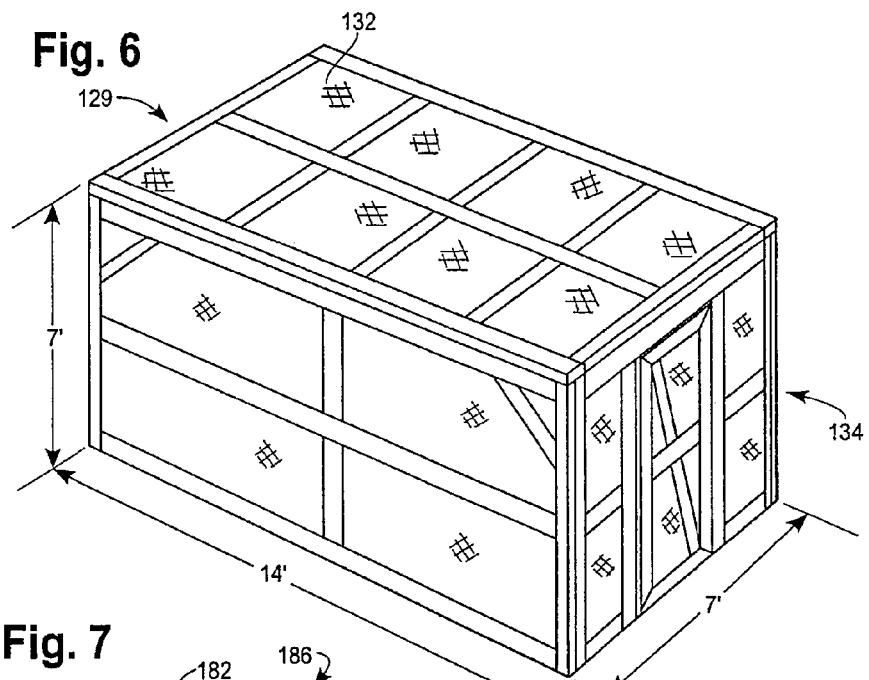
FIG. 6 is a pictorial view of another garden bed assembly constructed according to another embodiment of the invention.

Referring now to FIG. 6, there is shown another garden bed assembly 129, which is constructed in accordance with another embodiment of the present invention. The assembly 129 is generally similar to the assembly 10 of FIG. 1, except that the assembly 129 includes a roof 132 on the top of a fence 134, which is similar to the fence 23 of the assembly 10 of FIG. 1.

The assembly 129 includes at least one raised garden bed box (not shown), which may be similar to one or more of the raised garden bed boxes 12, 14 and 16 of FIG. 1. Each one of the raised garden bed boxes includes suitable planting soil or growing media (not shown) which may be similar to the box 12 of FIG. 1, for growing fruits or vegetables, or the like.

In the embodiments such as the assemblies 10 and 129, a floor (not shown) may extend under the vertical walls of the fence, and may be covered with a ground cover such as bark. The floor may be in the form of a mesh material such as poultry wire or hardware cloth, to prevent, or at least retard, the entrance into the enclosure by unwanted pests such as gophers.

An open mesh material such as the material 96 (FIG. 1) extends over the frame or fence sections of the assembly 129, and permits sunlight a well as pollinating bees to enter the enclosure while prohibiting unwanted creatures from gaining access thereto.

According to at least some of the disclosed embodiments of the invention, at least one of the garden bed boxes may be disposed adjacent to at least one of the vertical walls of the enclosure. In this manner, plants growing in the box can then affix themselves to the open mesh material of the vertical wall to serve as a trellis. Additionally, space is required to walk about within the fenced enclosure to enable a person to quickly enter the enclosure, such as via a gate, and harvest some of the plants in a quick and easy manner.

According to at least some of the embodiments of the invention, the boxes are generally rectangular in shape and are sufficiently narrow to permit a person to reach the plants growing in the box in a convenient manner. In the embodiment shown in FIGS. 1 through 5, there are three garden bed planter boxes arranged in a generally U-shaped configuration so that each one of the three boxes is disposed adjacent to at least one vertical wall. Also, there is sufficient space for a person to enter the fence 23 via the gate, and walk about the inside of the assembly and in areas or spaces defined partially by the three boxes so that a person can readily gain access to all three boxes. Additionally, the growing plants can use the open mesh material on all of the adjacent vertical walls as trellises.

Figure 7:
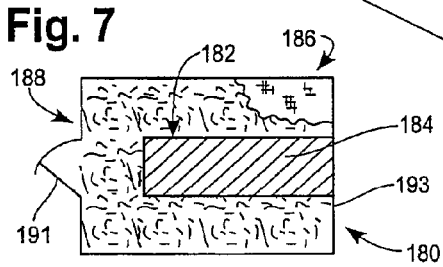
FIG. 7 is a diagrammatic plan view of yet another garden bed assembly constructed according to yet another embodiment of the invention.

Referring now to FIG. 7, there is shown another garden bed assembly 180, which is also constructed in accordance with an embodiment of the present invention. The assembly 180 includes a single raised garden bed planter box 182, which is generally rectangular in configuration and includes suitable planting soil or other growing media 184. A generally rectangular enclosure or fence 186 surrounds the box 182 and includes a front wall 188 having a gate 191. One side of the rectangular box 182 is disposed adjacent to a rear wall 193.

In general, the assembly 180 is similar to the assembly 10, except that the assembly 180 is generally smaller in size and has a single garden bed box.

Figure 8:
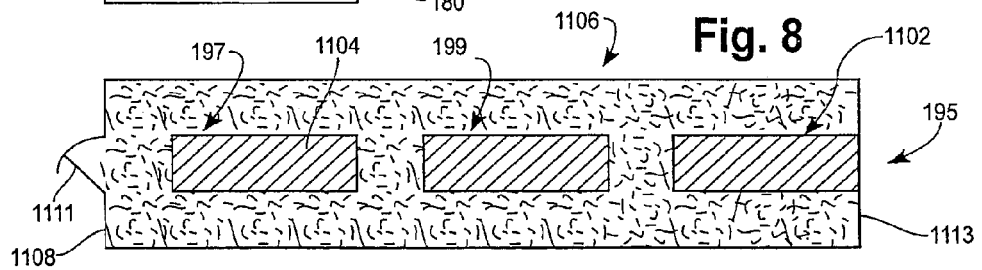
FIG. 8 is a diagrammatic plan view of still another garden bed assembly constructed according to still further embodiment of the invention.

Referring now to FIG. 8, there is shown yet another garden bed assembly 195, which is also constructed in accordance with yet another embodiment of the invention. The assembly 195 includes a set of three spaced-apart raised garden bed planter boxes 197, 199 and 1102, each containing planting soil such as planting soil 1104 in the box 197. The assembly 195 includes a generally rectangular enclosure 1106 having a front wall which includes a gate 1111. The box 1102 is disposed adjacent to a rear wall 1113 to permit the plants (not shown) growing in the box 1102 to use the rear wall 1113 as a trellis.

The boxes are each similar in size and shape to one another, and are spaced apart in a row.

Figure 9:
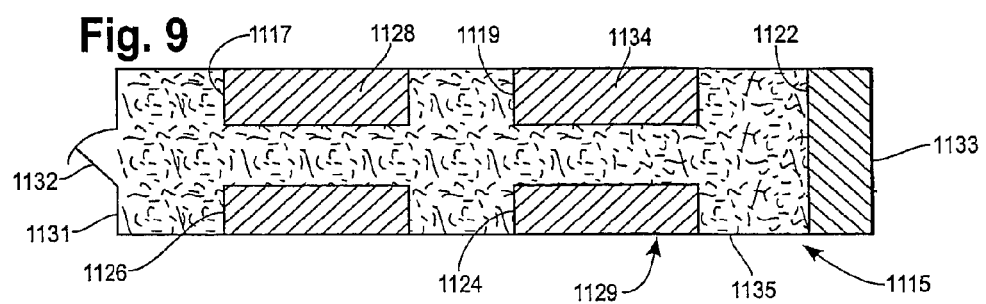
FIG. 9 is a diagrammatic plan view of yet a further garden bed assembly constructed according to still another embodiment of the present invention.

Referring now to FIG. 9, there is shown another garden bed assembly 1115, which is constructed in accordance with another embodiment of the invention. The assembly 1113 includes a set of five raised garden bed boxes 1117, 1119, 1122, 1124 and 1126. Each one of the boxes contains a suitable planting soil such as the soil 1128 in the box 1117.

A generally rectangular enclosure 1129 confines the five boxes and has a front wall 1131 with a gate 1132. Also, the enclosure includes a rear wall 1133 and a pair of side walls 1134 and 1135.

Each one of the boxes within the fence or enclosure 1129 is generally of the same size and shape, and are spaced apart from one another. Each box is disposed adjacent to one of the vertical walls of the fence or enclosure 1129.

In general, each one of the assemblies disclosed herein may be of any size or configuration, including triangular and circular. Also, the height of the vertical fence sections and the planter box walls may be of any suitable height. Also, the assembly may or may not include a roof. If a roof is included as shown in the embodiment of FIG. 6, the roof may be fixed to the side walls. The roof may also be removable, which may be preferable where the vertical walls are lower in height. Also, the gate may be optional, should the walls be sufficiently low in height so that a person can gain access to the interior of the enclosure by stepping over the top of the side walls.

Figure 14:
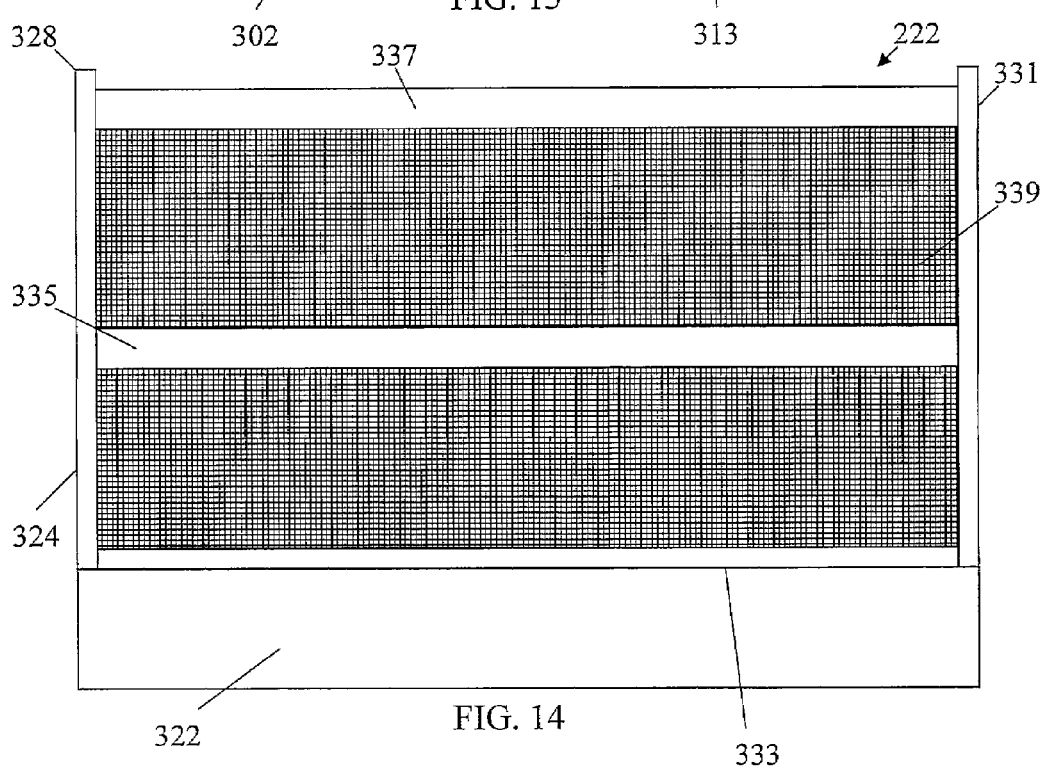
FIG. 14 is a front view of the rear section of the garden bed assembly of FIG. 10.
Figure 15:
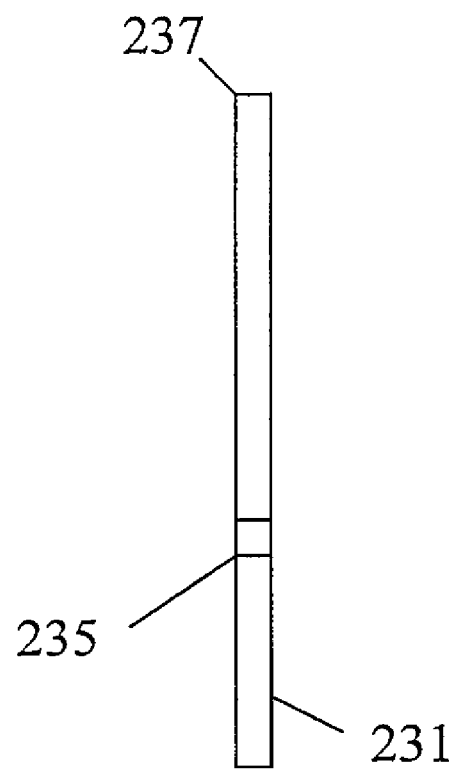
FIG. 15 is a side view of left front section of FIG. 11A.
Figure 16:
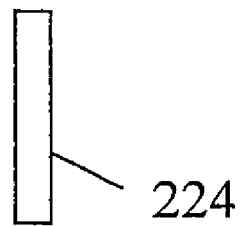
FIG. 16 is a side view of a section of the inner planter structure of FIG. 10.

Referring now to FIGS. 10 through 16 of the drawings, there is shown a garden bed assembly 200, which is constructed in accordance with an embodiment of the present invention. The assembly 200 may include an outer fence/planter structure 202 and an inner planter structure 204 cooperating to form a U-shaped planter 206 and a path 208. The planter 206 may contain soil or growing media for growing plants. The inner planter structure 204 may include a solid imperforate left upstanding wall 224, a solid imperforate right upstanding wall 226, and a solid imperforate rear upstanding wall 228 arranged in a U-shaped configuration. A typical end view of any of these upstanding walls is shown in FIG. 16, which is an end of left upstanding wall 224. It should be understood by those skilled in the art that other arrangements of the fence/planter structure and the inner planter structure may vary.

The fence/planter structure 202 at least partially surrounds the planter 206 to help protect the plants from unwanted pests from eating the plants. The fence/planter structure 202 may include a pair of front side sections 211, 213, a gate 215 for covering a gateway 216, a left side section 217, a right side section 219, and a rear section 222 arranged in a square configuration. Each of these sections will be described in greater detail below regarding FIGS. 11-15.

Referring now to FIGS. 11A-C, a front portion of the fence/planter structure 202 is shown. The front portion may include a left front section 211 (FIG. 11A), a gate 215 (FIG. 11B), and a right front section 213 (FIG. 11C).

The left front section 211 may include a solid lower portion 231 extending the length of the section and an upper frame portion 233 attached to the top of the solid lower portion 231. The upper frame portion 233 may include a bottom rail 235, a left upright post 237 extending from the left end of the bottom rail 235, a pair of right upright posts 239, 242 extending from the right end of the bottom rail 235, a top rail 244 spanning the upright posts 237 and 239, and an open mesh material 246 extending over the upper frame portion 233.

The right front section 213 may include a solid lower portion 251 extending the length of the section and an upper frame portion 253 attached to the top of the solid lower portion 251. The upper frame portion 253 may include a bottom rail 255, a right upright post 257 extending from the right end of the bottom rail 255, a pair of left upright posts 259, 262 extending from the left end of the bottom rail 255, a top rail 264 spanning the upright posts 257 and 259, and an open mesh material 266 extending over the upper frame portion 253.

A typical end view of the left front section and the right front section is shown in FIG. 15. The end view of one of the ends of the left front section 211 may include the left upright post 237, the bottom rail 235, and the solid lower portion 231 from top to bottom.

The gate 215 may include a frame portion 271 with an open mesh material 273 extending over the frame portion 271.

Referring now to FIG. 12, the left side section 217 is shown. The left side section 217 may include a solid lower portion 282 extending the length of the section and an upper frame portion 284 attached to the top of the solid lower portion 282. The upper frame portion 284 may include a tall left upright post 288, a short right upright post 291, a bottom rail 293, a top rail 295, and an open mesh material 297 extending over the upper frame portion 284. The rails 293, 295 may span the upright posts 288 and 291.

Figure 13:
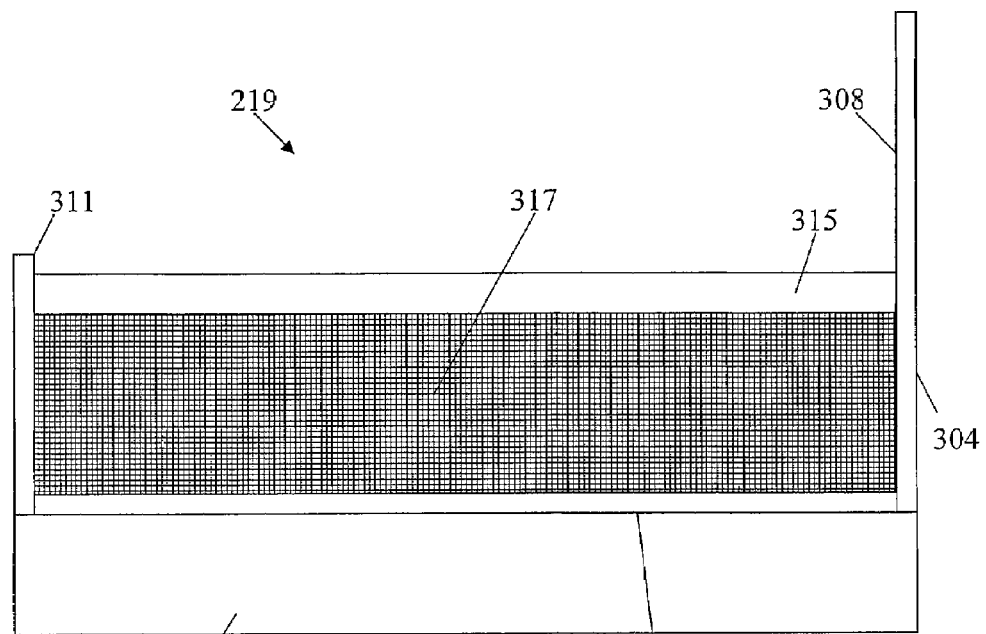
FIG. 13 is a front view of the right side section of the garden bed assembly of FIG. 10.

Referring now to FIG. 13, the right side section 219 is shown. The right side section 219 may include a solid lower portion 302 extending the length of the section and an upper frame portion 304 attached to the top of the solid lower portion 302. The upper frame portion 304 may include a short left upright post 308, a tall right upright post 311, a bottom rail 313, a top rail 315, and an open mesh material 317 extending over the upper frame portion 304. The rails 313, 315 may span the upright posts 308 and 311.

Referring now to FIG. 14, the rear section 222 is shown. The rear section 222 may include a solid lower portion 322 extending the length of the section and an upper frame portion 324 attached to the top of the solid lower portion 322. The upper frame portion 324 may include a tall left upright post 328, a tall right upright post 331, a bottom rail 333, a middle rail 335, a top rail 337, and an open mesh material 339 extending over the upper frame portion 324. The rails 333, 335, 337 may span the upright posts 328 and 331. The tall rear section 22 may serve as a trellis for certain growing plants.

Each of the solid imperforate lower portions 231, 251, 282, 302, 322 may have a height of approximately one to two feet. The upstanding walls 224, 226, 228 of the inner planter structure 204 may have the same height as the solid lower portions.

The open mesh material, such as material 246, 266, 273, 297, 317, and 339, may be poultry wire, hardware cloth, or other open mesh fabric and may be fastened by suitable means (not shown) to the backside of the fence sections and gate to prevent unwanted pests from entering the assembly 200.

Each of the upper frame portions 233, 253, 284, 304, and 324 is shown having a perforate material spanning the frame as described above. However, someone skilled in the art will recognize that a solid imperforate material could also be utilized to span these frames.

Figure 10:
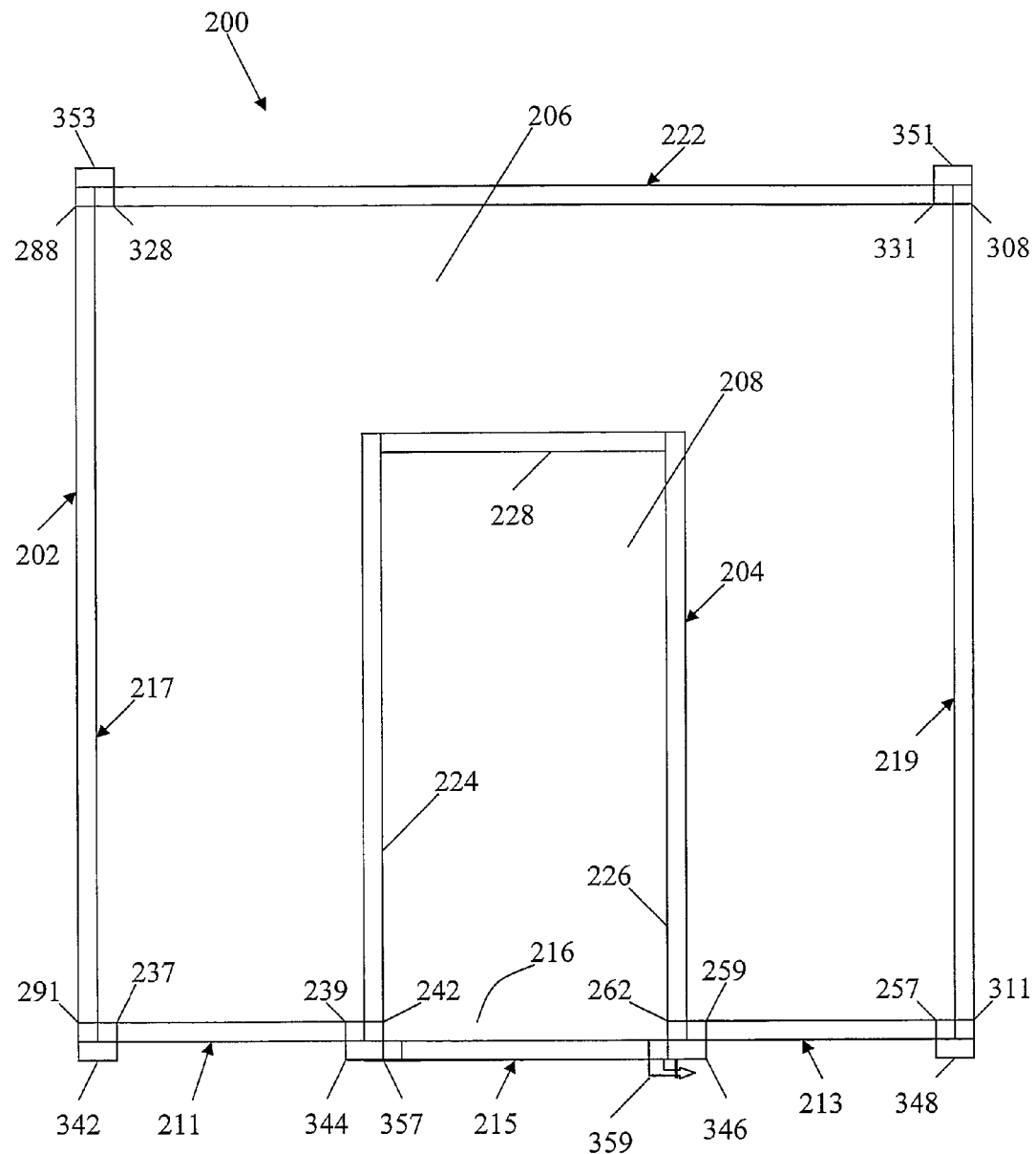
FIG. 10 is a plan view of another garden bed assembly constructed according to still another embodiment of the present invention.

To assemble the garden bed assembly 200, the outer fence/planter structure may be constructed as shown in FIG. 10. Ends of the left front section 211 and the left side section 217 may be attached together at a right angle. The left upright post 237 and the solid lower portion 231 of the front left section 211 may be attached to the right upright post 291 and the solid lower portion 282 of the left side section, respectively, with suitable fastening devices, such as screws. A face rail 342 may be fastened to the upright posts 237, 291 and the ends of lower portions 231, 282 to form the appearance of a larger post and add stability.

Ends of the left side section 217 and the rear section 222 may now be attached together at a right angle. The left upright post 288 and the solid lower portion 282 of the left side section 217 may be attached to the left upright post 328 and the solid lower portion 322 of the rear section, respectively, with suitable fastening devices, such as screws. A face rail 353 may be fastened to the upright posts 288, 328 and the ends of lower portions 382, 302 to form the appearance of a larger post and add stability.

Ends of the rear section 222 and the right side section 219 may then be attached together at a right angle. The right upright post 331 and the solid lower portion 322 of the rear section 222 may be attached to the right upright post 308 and the solid lower portion 302 of the right side section, respectively, with suitable fastening devices, such as screws. A face rail 351 may be fastened to the upright posts 331, 308 and the ends of lower portions 322, 302 to form the appearance of a larger post and add stability.

Ends of the right side section 219 and the right front section 213 may be attached together at a right angle. The left upright post 311 and the solid lower portion 302 of the right side section 219 may be attached to the left upright post 257 and the solid lower portion 251 of the right front section, respectively, with suitable fastening devices, such as screws. A face rail 348 may be fastened to the upright posts 311, 257 and the ends of lower portions 302, 251 to form the appearance of a larger post and add stability.

Next the inner planter structure 204 may be constructed by fastening an end of both the left upstanding wall 224 and the right upstanding wall 226 to the ends of the rear upstanding wall 228 into a U-shaped configuration using suitable fastening devices, such as screws. The unattached ends of the left upstanding wall 224 and the right upstanding wall 226 may then be fastened to the unattached ends of the solid lower portion 231 of the left front section 211 and the solid lower portion 251 of the right front section 213, respectively, using suitable fastening devices, such as screws, forming the U-shaped planter 206 and the path 208.

A face rail 344 may then be fastened to upright posts 239, 242 and the solid lower portion 231 of left front section 211 to form the appearance of a larger post and add stability. Likewise, a face rail 346 may be fastened to upright posts 259, 262 and the solid lower portion 251 of right front section 213 to form the appearance of a larger post and add stability.

A cap block, similar to the cap block 105 shown with assembly 10 in FIG. 1 may attached to each of the large posts formed using the face rails, 342, 344, 346, 348, 351, and 353. The cap block may be provided for decorative purposes and to conceal, to a certain extent, the fact that each of the large posts is composed of a set of three rails. In this manner, the garden bed assembly 200 may be conveniently assembled without the use of posts and have a finished as well as an aesthetically pleasing appearance.

Finally, the gate 215 may be connected between the front fence sections 211 and 213 by attaching the gate 215 to the face rail 344 using at least two hinges 357. A gate latch 359 may be attached to the gate 215 and the face rail 346 to releasably secure the gate 215 in place.

It is to be understood that a tall section may be included as one or more of the sections, or all of the sections can be the same height, if desired. The height of the sections, such as the sections 211, 213, 217, 219, and 222, as well gate 215 may all be substantially the same, and may vary in size, such as between about three feet and about seven feet. Furthermore, the height of the solid lower portions, such as lower portions 231, 251, 282, 302, and 322, and of the upstanding walls of the inner planter structure 204, such as walls 224, 226, and 228, may all be substantially the same, and may vary in size, such as between about six inches and about two feet.

An irrigation system may be provided with garden bed assembly 200 to supply water to the plants to facilitate their growth in a similar manner as shown with garden bed assembly 10. One or more tool holders may be attached one or more of the upstanding walls 224, 226, and 228 for conveniently holding garden tools for use by the gardener in the same manner as tool holder 47 shown with garden bed assembly 10.

As shown in FIG. 10, the fence/planter structure 202 and inner planter structure 204 provide support for one another. However, it is to be understood that the fence/planter structure 202 and the inner planter structure 204 may be supported in a conventional manner by concrete footings (not shown).

Figure 17:
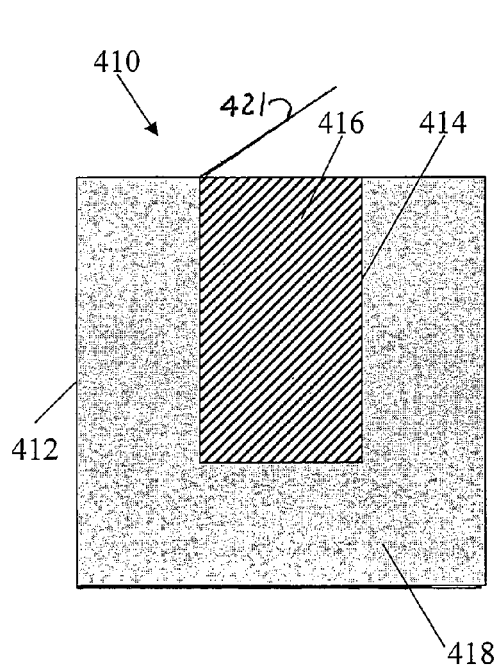
FIG. 17 is a diagrammatic plan view of yet another garden bed assembly constructed according to yet another embodiment of the invention.

Referring now to FIG. 17, there is shown another garden bed assembly 410, which is also constructed in accordance with an embodiment of the present invention. The assembly 410 may include an outer fence/planter structure 412 and an inner planter structure 414 forming a single raised garden planter 416, which is generally rectangular in configuration and includes suitable planting soil or other growing media, and a path 418 for accessing the planter 416. A gate 421 may be provided allowing access to the path 418.

In general, the assembly 410 is similar to the assembly 200, except that the assembly 410 is generally smaller in size and has a smaller planter.

Figure 18:
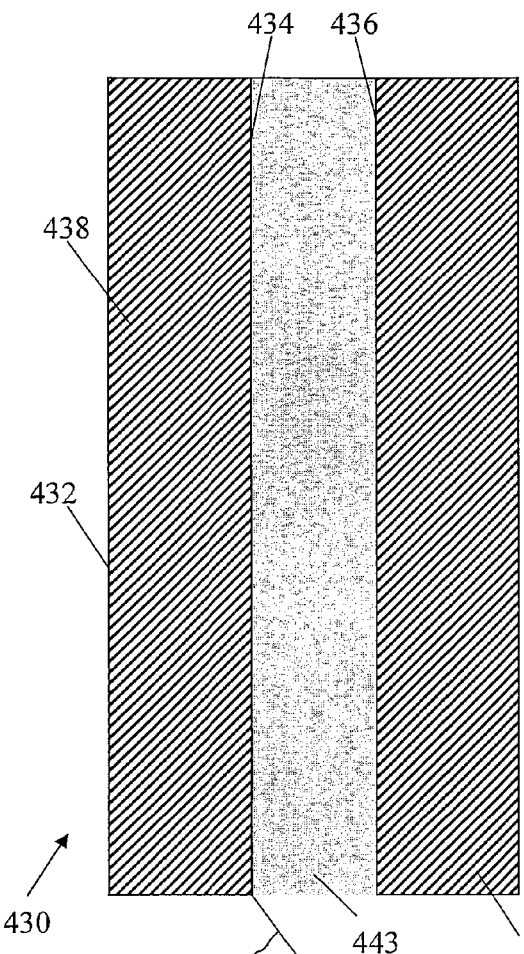
FIG. 18 is a diagrammatic plan view of still another garden bed assembly constructed according to still further embodiment of the invention.

Referring now to FIG. 18, there is shown yet another garden bed assembly 430, which is also constructed in accordance with yet another embodiment of the invention. The assembly 430 may include an outer fence/planter structure 432 and an inner planter structure having a pair of independent upstanding walls 434, 436 forming a pair of garden bed planters 438, 441, which are generally rectangular in configuration and include suitable planting soil or other growing media, and a path 443 for accessing the planters 438, 441. A gate 445 may be provided allowing access to the path 443.

In general, the assembly 430 is similar to the assembly 200, except that the assembly 430 is generally larger in size with a larger planter and designed for an individual with a long narrow area for a garden.

Figure 19:
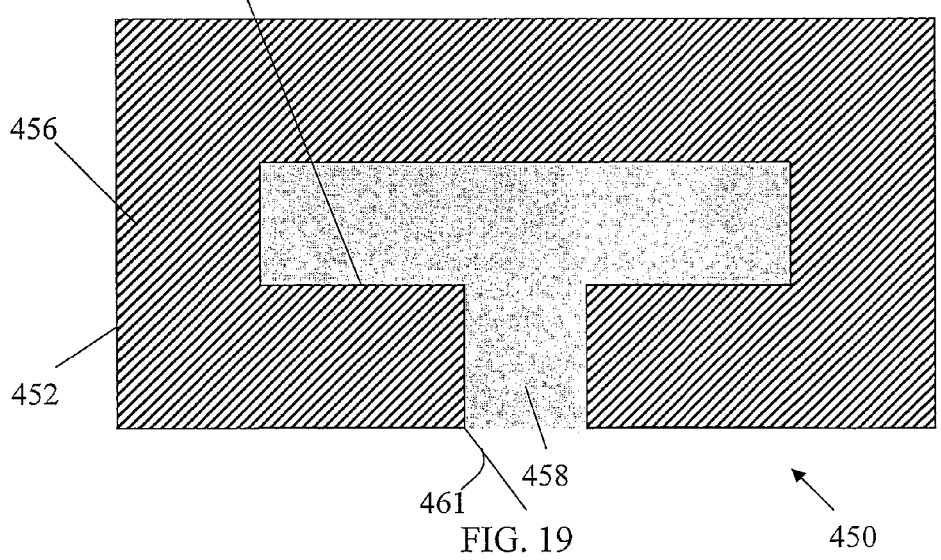
FIG. 19 is a diagrammatic plan view of yet a further garden bed assembly constructed according to still another embodiment of the present invention.

Referring now to FIG. 19, there is shown another garden bed assembly 450, which is constructed in accordance with another embodiment of the invention. The assembly 450 may include an outer fence/planter structure 452 and an inner planter structure 454 forming a garden bed planter 456, which is generally C-shaped in configuration and includes suitable planting soil or other growing media, and a T-shaped path 458 for accessing the planter 456. A gate 461 may be provided allowing access to the path 458.

In general, the assembly 450 is similar to the assembly 200, except that the assembly 450 is generally larger in size with a larger planter and designed for an individual with a short wide area for a garden.

In general, each one of the assemblies 200, 410, 430, and 450 may be of any size or configuration, including triangular and circular. Also, the height of the vertical fence sections and the inner planter structure walls may be of any suitable height. Also, the assembly may or may not include a roof. If a roof is included as shown in the embodiment of FIG. 6, the roof may be fixed to the side walls. The roof may also be removable, which may be preferable where the vertical walls are lower in height. Also, the gate may be optional, should the walls be sufficiently low in height so that a person can gain access to the interior of the enclosure by stepping over the top of the side walls.

In the embodiments such as the assemblies 200, 410, 430, and 450, a floor (not shown) may extend under the sections of the fence/planter structure, and may be covered with a ground cover such as bark. The floor may be in the form of a mesh material such as poultry wire or hardware cloth, to prevent, or at least retard, the entrance into the enclosure by unwanted pests such as gophers.

According to the disclosed embodiments of the garden bed assemblies 200, 410, 430, and 450, the planter(s) may be disposed adjacent to at least one of the fence sections of the assembly. In this manner, plants growing in the planter can then affix themselves to the open mesh material of the fence/planter structure to serve as a trellis. Additionally, space is required to walk about within the fenced enclosure to enable a person to quickly enter the enclosure, such as via a gate, and harvest some of the plants in a quick and easy manner.

According to the disclosed embodiments of the garden bed assemblies 200, 410, 430, and 450, the planters are sufficiently narrow to permit a person to reach the plants growing in the planter in a convenient manner. In the embodiment shown in FIGS. 10 through 14, there is a generally U-shaped planter 206 and a path 208 disposed within the fence/planter structure 202. Also, there is sufficient space for a person to enter the fence/planter structure 202 via the gate, and walk about the inside of the assembly and in areas or spaces defined by the inner planter structure 204 so that a person can readily gain access to all of the planter 206. Additionally, the growing plants can use the open mesh material on all of the adjacent fence sections as trellises.

Figure 20:
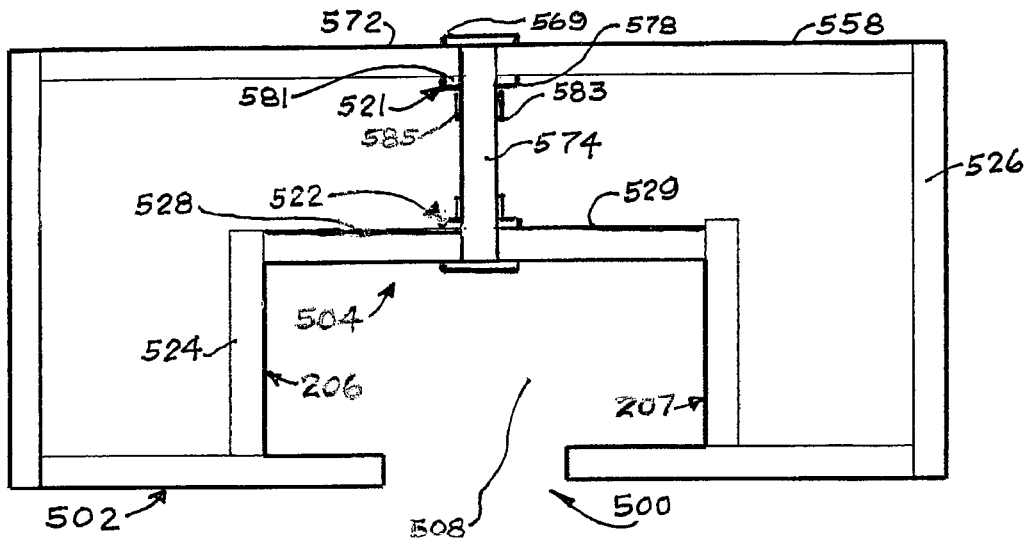
FIG. 20 is a diagrammatic plan view of yet another garden bed assembly constructed according to yet another embodiment of the invention.
Figure 21:
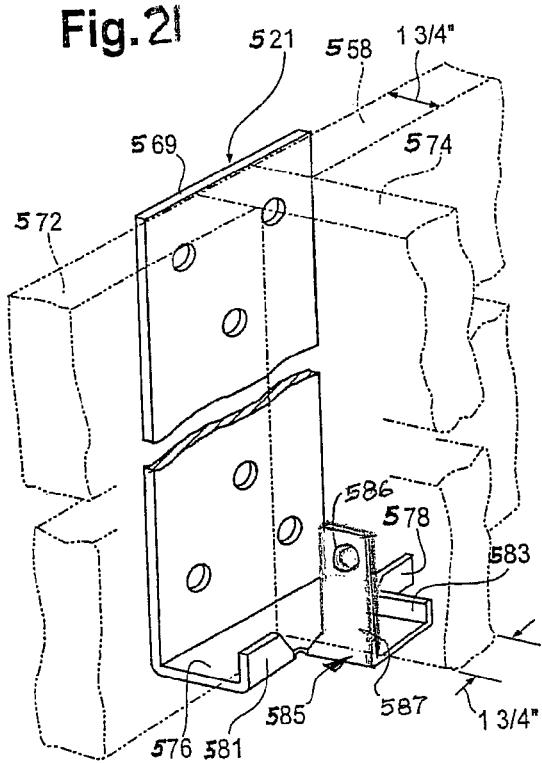
FIG. 21 is a fragmentary enlarged pictorial view of a T bracket, illustrating it mounted in place in the assembly of FIG. 20.

Referring now to FIGS. 20 and 21 of the drawings, there is shown a garden bed assembly 500, which is constructed in accordance with an embodiment of the present invention, and which is generally similar to the garden bed assembly 200 except the assembly 500 employs a stiffening inner planter structure wall 503 and T brackets 521 and 522. The assembly 500 may include an outer fence/planter structure 502 and an inner planter structure 504 cooperating to form a pair of L-shaped planters 506 and 507 and an interior walking area or path 508. The planters 506 and 507 may contain soil or growing media for growing plants. The inner planter structure 504 may include a solid imperforate left upstanding wall 524, a solid imperforate right upstanding wall 526, and a pair of aligned solid imperforate rear upstanding walls 528 and 529 arranged in a generally U-shaped configuration. The height of the imperforate inner walls may be substantially equal to the height of the imperforate lower portion of the outer fence/planter structure walls. A typical end view of any of these upstanding walls is similar to the one shown in FIG. 16, which is an end of left upstanding wall 224. It should be understood by those skilled in the art that other arrangements of the fence/planter structure and the inner planter structure may vary.

The upstanding imperforate stiffening wall extends between the opposed ends of the aligned walls 528 and 529 and at its opposite end to a position between the ends of a pair of fence/planter rear walls 572 and 558. The T brackets 522 and 521 secure the walls in place. The bracket 522 joins the end of the wall 574 to the walls 528 and 529 in a T shaped configuration. The T bracket 521 secures the rear end of the stiffening wall 574 to the aligned rear walls 572 and 558 in a T shaped configuration.

The stiffening wall 574 helps stabilize the upstanding rear walls 572 and 558 as well as the aligned imperforate inner walls 528 and 529. It should be understood that the aligned walls may be arranged in abutting end-to-end walls and, the end of the stiffening wall 574 can be joined in an abutting relationship flush against the abutting walls. The T brackets can secure the walls in such an arrangement.

Referring now to FIG. 21, the T brackets such as the T bracket 521 will now be described in greater detail for joining together the ends of the aligned rear walls 558 and 572, with the end of the stiffening wall 574, which serves as a common wall between the L-shaped planter boxes 206 and 207. The bracket 21 includes a single upstanding flange 569 which is adapted to be secured to three separate walls such as the walls 558, 572 and 574 to join them in a T configuration. In this regard, the upstanding flange 569 is perforated to receive fastening devices such as screws (not shown) to secure the walls in the T-shaped configuration.

A T-shaped horizontal flange 576 is integrally connected to the bottom edge of the upstanding flange 569. An upstanding flange or retainer 578 is spaced from and parallel to the upstanding flange 569 to receive an end portion of the wall 558 therebetween while it is being fastened in place. Similarly, an upstanding flange or retainer 581 is spaced from and parallel to the upstanding flange 569 to receive the wall 572 therebetween while it is being fastened in place to the upstanding flange 569.

A pair of upstanding flanges or retainers 583 and 585 on the horizontal flange 576 are adapted to receive common stiffening the wall 574 therebetween while it is being fastened in place to the flange 569. In this regard, screws or other fastening devices (not shown) fasten the flange 569 to an edge of the wall 574. Also, the flange 585 has a substantially greater height than the flange 583 and has at least one hole such as a hole 586 in a face 587 to receive a fastening device such as a wood screw (not shown) driven into the face of the common wall 574.

It should be understood that the words "about" and "approximately" as used herein means a tolerance of plus or minus 20 percent.

The upstanding flange 69 may vary in height in a similar manner as the upstanding flanges 54 and 56 of the corner bracket 18.

While particular embodiments of the present invention have been disclosed, it is to be understood that various different modifications are passing and one contemplated within the true spirit and scope of the appended claims. For example, planter box walls could be composed of a variety of materials, such as wood, plastic, metal and other. There is no intention, therefore, of limitations to the exact abstract or disclosure herein presented.

What is claimed is:

1. A garden bed assembly, comprising:
   an outer fence/planter structure surrounding an enclosed area including a plurality of fence/planter sections and a gateway permitting access to the enclosed area;
   each of the fence/planter sections including a lower portion to help define at least one planter;
   a gate for closing over the gateway;
   an upright inner planter structure disposed within the enclosed area and attached to the outer fence/planter structure at two or more locations to help define the at least one planter;
   a path disposed within the enclosed area and being accessed through the gateway, the path being upright defined by the inner planter structure and the gateway;
   the at least one planter for holding planting media defined by the lower portions of the fence/planter upright sections and the inner planter structure;
   the outer fence/planter structure including an arrangement of the fence/planter sections joined together at their ends; and each of the fence/planter sections includes an upright post at each end of the section for attachment to corresponding end upright posts of adjoining fence/planter sections to form adjoining pairs of end upright posts; and
   each of the fence/planter sections includes a pair of end upright posts for attachment to corresponding end upright posts of adjoining fence/planter sections.

2. The garden bed assembly according to claim 1, wherein each of the fence/planter sections include a perforated upper section.

3. The garden bed assembly according to claim 1, wherein the height of the lower portions of the fence/planter sections is substantially the same as the height of the upright inner planter structure.

4. The garden bed assembly according to claim 1, wherein the height of the upright inner planter structure is between about six inches and about two feet.

5. The garden bed assembly according to claim 1, wherein the height of the inner planter structure is about one foot.

6. The garden bed assembly according to claim 1, wherein the upright inner planter structure and the outer fence/planter structure are joined by a common stiffening wall.

7. The garden bed assembly according to claim 1, further including at least one T bracket having an upstanding flange and a T shaped horizontal flange connected to the upstanding flange, and a pair of parallel spaced apart upstanding flanges for securing one of the fence/planter sections to the upright inner planter structure, one of the upstanding parallel flanges having a substantially greater height than the other parallel flange and having a fastening device receiving opening therein.

* * * * *

UNITED STATES PATENT AND TRADEMARK OFFICE
CERTIFICATE OF CORRECTION

PATENT NO. : 7,490,435 B2
APPLICATION NO. : 11/957328
DATED : February 17, 2009
INVENTOR(S) : Lisa R. Singer It is certified that error appears in the above-identified patent and that said Letters Patent is hereby corrected as shown below:

Claim 1, column 12, line 43 - delete "upright"
    Claim 1, column 12, line 44 - insert -- upright -- after the words "defined by the"
    Claim 1, column 12, line 46 - delete "upright"
    Claim 1, column 12, line 47 - insert -- upright -- after the word "the"
    Claim 5, column 13, line 2 - insert -- upright -- after the words "height of the"

Signed and Sealed this

Seventh Day of September, 2010

David J. Kappos
*Director of the United States Patent and Trademark Office*